(12) United States Patent
Karasawa (10) Patent No.: US 12,484,769 B2
(45) Date of Patent: Dec. 2, 2025

(54) PUMP TUBE UNIT AND ENDOSCOPE SYSTEM

(71) Applicants: FORTE GROW MEDICAL CO., LTD., Tochigi (JP); ORT MEDICAL CO., LTD., Kanagawa (JP)

(72) Inventor: Koji Karasawa, Tochigi (JP)

(73) Assignees: FORTE GROW MEDICAL CO., LTD., Tochigi (JP); ORT MEDICAL CO., LTD., Kanagawa (JP)

( * ) Notice: Subject to any disclaimer, the term of this patent is extended or adjusted under 35 U.S.C. 154(b) by 384 days.

(21) Appl. No.: 18/003,341

(22) PCT Filed: Jun. 16, 2021

(86) PCT No.: PCT/JP2021/022810
§ 371 (c)(1),
(2) Date: Dec. 27, 2022

(87) PCT Pub. No.: WO2022/004380
PCT Pub. Date: Jan. 6, 2022

(65) Prior Publication Data
US 2023/0248226 A1 Aug. 10, 2023

(30) Foreign Application Priority Data
Jun. 29, 2020 (JP) .................. 2020-111716

(51) Int. Cl.
*A61B 1/00* (2006.01)
*A61B 1/015* (2006.01)
*A61B 1/018* (2006.01)

(52) U.S. Cl.
CPC .............. *A61B 1/015* (2013.01); *A61B 1/018* (2013.01)

(58) Field of Classification Search
CPC ........... A61B 1/015; A61B 1/018; A61B 1/12; A61M 25/00; A61M 39/26–288;
(Continued)

(56) References Cited

U.S. PATENT DOCUMENTS

| 4,838,856 A | 6/1989 | Mulreany et al. |
| 5,041,096 A * | 8/1991 | Beuchat ................. A61M 1/80 417/477.13 |

(Continued)

FOREIGN PATENT DOCUMENTS

| JP | H10216079 A | 8/1998 |
| JP | 2006167049 A | 6/2006 |
| JP | 201192309 A | 5/2011 |

OTHER PUBLICATIONS

Extended European Search Report in EP Application No. 21833212.0 dated May 28, 2024, 7pp.
(Continued)

*Primary Examiner* — Anh Tuan T Nguyen
*Assistant Examiner* — James Edward Boice
(74) *Attorney, Agent, or Firm* — HAUPTMAN HAM, LLP (57) ABSTRACT

A pump tube unit according to the present invention includes a pump tube for sending and drawing liquid, an upstream-side water supply tube connected to an upstream-side end portion of the pump tube, a downstream-side water supply tube connected to a downstream-side end portion of the pump tube, and a bypass water supply tube, connected across the upstream-side water supply tube and the downstream-side water supply tube, and returns a part of the liquid flowing through the downstream-side water supply tube to flow back into the upstream-side water supply tube. The bypass water supply tube has a small-diameter portion in a predetermined range except for both end portions of the bypass water supply tube. The small-diameter portion has an inner diameter smaller than an inner diameter of other range.

2 Claims, 5 Drawing Sheets

(58) Field of Classification Search
CPC .......... A61M 39/24; A61M 2039/0009; A61M 2039/0018; A61M 2039/0027; A61M 2039/2406; A61M 2039/2413; A61M 2039/242; A61M 2039/2493; F04B 23/02; F04B 43/1253; F04B 43/0081; F04B 43/009; F04B 49/035
USPC ........ 600/104, 207, 208, 156; 604/523, 118, 604/65, 67
See application file for complete search history.

(56) References Cited

U.S. PATENT DOCUMENTS

| | | | | |
|---|---|---|---|---|
| 5,133,336 | A | * | 7/1992 | Savitt ................. A61B 1/12 600/103 |
| 5,605,545 | A | | 2/1997 | Nowosielski et al. |
| 5,813,842 | A | * | 9/1998 | Tamari ................ F16K 7/07 417/63 |
| 6,030,359 | A | * | 2/2000 | Nowosielski ....... A61M 3/0241 604/67 |
| 2001/0025135 | A1 | | 9/2001 | Naito et al. |
| 2005/0238504 | A1 | * | 10/2005 | Yajima ................. F04B 43/084 417/322 |
| 2006/0047240 | A1 | * | 3/2006 | Kumar ................. A61M 3/022 604/65 |
| 2006/0122556 | A1 | * | 6/2006 | Kumar ................ A61M 3/0212 604/67 |
| 2008/0091061 | A1 | | 4/2008 | Kumar et al. |
| 2008/0091071 | A1 | | 4/2008 | Kumar et al. |
| 2014/0180010 | A1 | * | 6/2014 | Kumar ................ A61M 3/0229 600/156 |
| 2018/0363638 | A1 | * | 12/2018 | Holzhausen ...... A61M 5/14232 |

OTHER PUBLICATIONS

Office Action in CN Application No. 202180044063.5, dated Jun. 11, 2025, 12pp.

* cited by examiner

| ELAPSED TIME | DISCHARGE AMOUNT | CHANGE AMOUNT | WATER DRIPPING |
|---|---|---|---|
| 30(s) | 260(ml) | 260(ml) | NONE |
| 60(s) | 518(ml) | 258(ml) | NONE |
| 90(s) | 776(ml) | 258(ml) | NONE |
| 120(s) | 1034(ml) | 258(ml) | NONE |
| 150(s) | 1292(ml) | 258(ml) | NONE |
|  | Ave | 258.4(ml) |  |

Fig.5B

| ELAPSED TIME | DISCHARGE AMOUNT | CHANGE AMOUNT | WATER DRIPPING |
|---|---|---|---|
| 30(s) | 346(ml) | 346(ml) | NONE |
| 60(s) | 692(ml) | 346(ml) | NONE |
| 90(s) | 1036(ml) | 344(ml) | NONE |
| 120(s) | 1382(ml) | 346(ml) | NONE |
| 150(s) | 1725(ml) | 343(ml) | NONE |
|  | Ave | 343(ml) |  |

Fig.6A

| ELAPSED TIME | DISCHARGE AMOUNT | CHANGE AMOUNT | WATER DRIPPING |
|---|---|---|---|
| 30(s) | 106(ml) | 106(ml) | ONE SECIND OR LESS |
| 60(s) | 210(ml) | 104(ml) | ONE SECIND OR LESS |
| 90(s) | 314(ml) | 104(ml) | ONE SECIND OR LESS |
| 120(s) | 418(ml) | 104(ml) | ONE SECIND OR LESS |
| 150(s) | 522(ml) | 104(ml) | ONE SECIND OR LESS |
|  | Ave | 104.4(ml) |  |

Fig.6B

| ELAPSED TIME | DISCHARGE AMOUNT | CHANGE AMOUNT | WATER DRIPPING |
|---|---|---|---|
| 30(s) | 134(ml) | 134(ml) | ABOUT FIVE SECOND |
| 60(s) | 270(ml) | 136(ml) | ABOUT FIVE SECOND |
| 90(s) | 404(ml) | 134(ml) | ABOUT FIVE SECOND |
| 120(s) | 536(ml) | 132(ml) | ABOUT FIVE SECOND |
| 150(s) | 670(ml) | 134(ml) | ABOUT FIVE SECOND |
|  | Ave | 134(ml) |  |

PUMP TUBE UNIT AND ENDOSCOPE SYSTEM

RELATED APPLICATIONS

The present application is U.S. national stage of application No. PCT/JP2021/022810, filed on Jun. 16, 2021, and claims priority based on Japanese Patent Application No. 2020-111716, filed Jun. 29, 2020.

TECHNICAL FIELD

The present invention relates to a pump tube unit and an endoscope system.

BACKGROUND ART

In a medical field, examinations and surgical operations using an endoscope have been widely performed. The endoscope includes a light guide that illuminates a target site in a body cavity, an objective lens for an image pickup apparatus that observes and pick up the target site in the body cavity, an air/water supply nozzle that send an air and a liquid such as saline into the body cavity, and a forceps port that allows a treatment instrument such as forceps to project into the body cavity, at a distal end of an insertion portion. The forceps port also functions as a suction port for aspirating liquid used to clean the target site in the body cavity, or an injection port for injecting the liquid into the body cavity. Further, in recent years, an endoscope has been provided in which a secondary water supply port for ejecting a liquid into the body cavity at a distal end of an insertion portion (see Patent Literature 1). The endoscopes equipped with a secondary water supply port at the distal end of the insertion portion can be used to clean the target site in the body cavity in parallel with the use of instruments using the forceps channel, allowing for more efficient examinations and surgical operations using the endoscope.

A liquid used in examinations or surgical operations using the endoscope is stored in a water supply tank, for example, and send a forceps channel or a secondary water supply channel in the endoscope by driving a water supply device. The water supply device, for example, is a device in which a built-in pump is driven by stepping on a foot switch to draw in the liquid stored in a water supply tank into a water supply tube and send it toward an endoscope.

CITATION LIST

Patent Literature

[PTL 1] JP 2006-167049 A

SUMMARY OF INVENTION

Technical Problem

Here, an inner diameter of the forceps port is 2 mm to 3.2 mm, whereas an inner diameter of the secondary water supply port is as small as about 1 mm. when the water supply device is driven, an internal pressure of the water supply tube becomes higher than an atmospheric pressure. For example, after the water supply device is stopped, it takes long time for the internal pressure of the water supply tube to return to the atmospheric pressure. As a result, even if the water supply device is stopped, the liquid continues to flow out of the water supply port until the internal pressure of the secondary water supply tube returns to the atmospheric pressure, a so-called a problem of "poor drainage". The problem of "poor drainage" with the efficiency of endoscopic examinations and surgical procedures.

Further, the water supply device repeatedly draws in liquid stored in the water supply tank and sends the drawn in liquid toward the endoscope by squeezing the water supply tube installed inside the device with each of the multiple rollers while rotating the rotor, which has multiple rollers supported on its outer peripheral edge. Therefore, when the internal pressure of the water supply tube increases, a phenomenon occurs in which the water tube squeezed by each of the plurality of rollers cracks in the extension direction of the water tube, or the tube breaks and leaks. The occurrence of such a phenomenon not only makes it impossible to perform examinations or surgical operations using the endoscope efficiently, but also endangers patients. Therefore, there is a growing need for a means to reliably supply the water to the endoscope during examinations or surgical operations using the endoscope.

The present invention has an object to provide a technology that enables reliably supplying water to an endoscope during an examination or a surgical operation using the endoscope, and improvement of drainage when a water supply device is stopped.

Solution to Problem

In one aspect, according to the present invention, there is provided a pump tube unit, including: a pump tube installed in a pump including a rotary body and a plurality of pressing portions arranged on an outer peripheral edge portion of the rotary body at predetermined angular intervals, the pump tube being configured to repeat an operation of sending a liquid held inside to a downstream side and drawing in a liquid from an upstream side when being pressed by any one of the plurality of pressing portions in turn during rotation of the rotary body; an upstream-side water supply tube connected to an upstream-side end portion of the pump tube to allow the liquid drawn into the pump tube to flow therethrough; a downstream-side water supply tube connected to a downstream-side end portion of the pump tube to allow the liquid sent from the pump tube to flow therethrough; and a bypass water supply tube connected to bridge the upstream-side water supply tube and the downstream-side water supply tube, the bypass water supply tube being configured to cause a part of the liquid flowing through the downstream-side water supply tube to flow back into the upstream-side water supply tube, wherein the bypass water supply tube includes a small-diameter portion extending over a predetermined range except for both end portions of the bypass water supply tube in a longitudinal direction of the bypass water supply tube, the small-diameter portion having an inner diameter smaller than an inner diameter of a range of the bypass water supply tube except for the predetermined range.

Further, the bypass water supply tube includes: a first water supply tube to be connected to the downstream-side water supply tube; a second water supply tube having the same diameter as a diameter of the first water supply tube, the second water supply tube to be connected to the upstream-side water supply tube; and a third water supply tube arranged between the first water feed tube and the second water feed tube, the third water feed tube having an inner diameter smaller than an inner diameter of the first water supply tube and an inner diameter of the second water supply tube.

Further, it is preferred that a clamp is arranged in the first water supply tube, and being configured to switch between a state in which the first water supply tube is closed and a state in which the first water supply tube is open, and wherein the clamp maintain the first water supply tube in the open state when the downstream-side water supply tube is connected to an secondary water supply channel of an endoscope and maintain the first water supply tube in the closed state when the downstream-side water supply tube is connected to a forceps channel of the endoscope.

Further, in one aspect, according to the present invention, there is provided an endoscope system, including: an endoscope including a forceps channel configured to allow at least a treatment instrument such as forceps to be inserted therethrough and a water supply channel configured to allow the liquid to flow therethrough; a water supply tank configured to store a liquid; a pump including a rotary body and a plurality of pressing portions arranged on an outer peripheral edge portion of the rotary body at predetermined angular intervals; and the pump tube unit described above, the pump tube unit having one end portion to be connected to the water supply tank and other end portion to be connected to at least one of the forceps channel or the water supply channel of the endoscope, wherein, when the downstream-side end portion of the pump tube unit is connected to the water supply channel of the endoscope, the pump is driven under a state in which the bypass water supply tube is maintained in the open state so as to supply the liquid to the water supply channel of the endoscope while causing a part of the liquid sent by the pump tube to flow back inside the pump tube unit, and wherein, when the downstream-side end portion of the pump tube unit is connected to the forceps channel of the endoscope, the pump is driven under a state in which the bypass water supply tube is maintained in the closed state so as to send the liquid sent by the pump tube to the forceps channel of the endoscope without causing the liquid to flow back inside the pump tube unit.

Advantageous Effects of Invention

According to the present disclosure, it is possible to enable reliable water sending to the endoscope and improve drainage after stop of the water supply device during an examination or a surgical operation using the endoscope.

DESCRIPTION OF EMBODIMENTS

Figure 1:
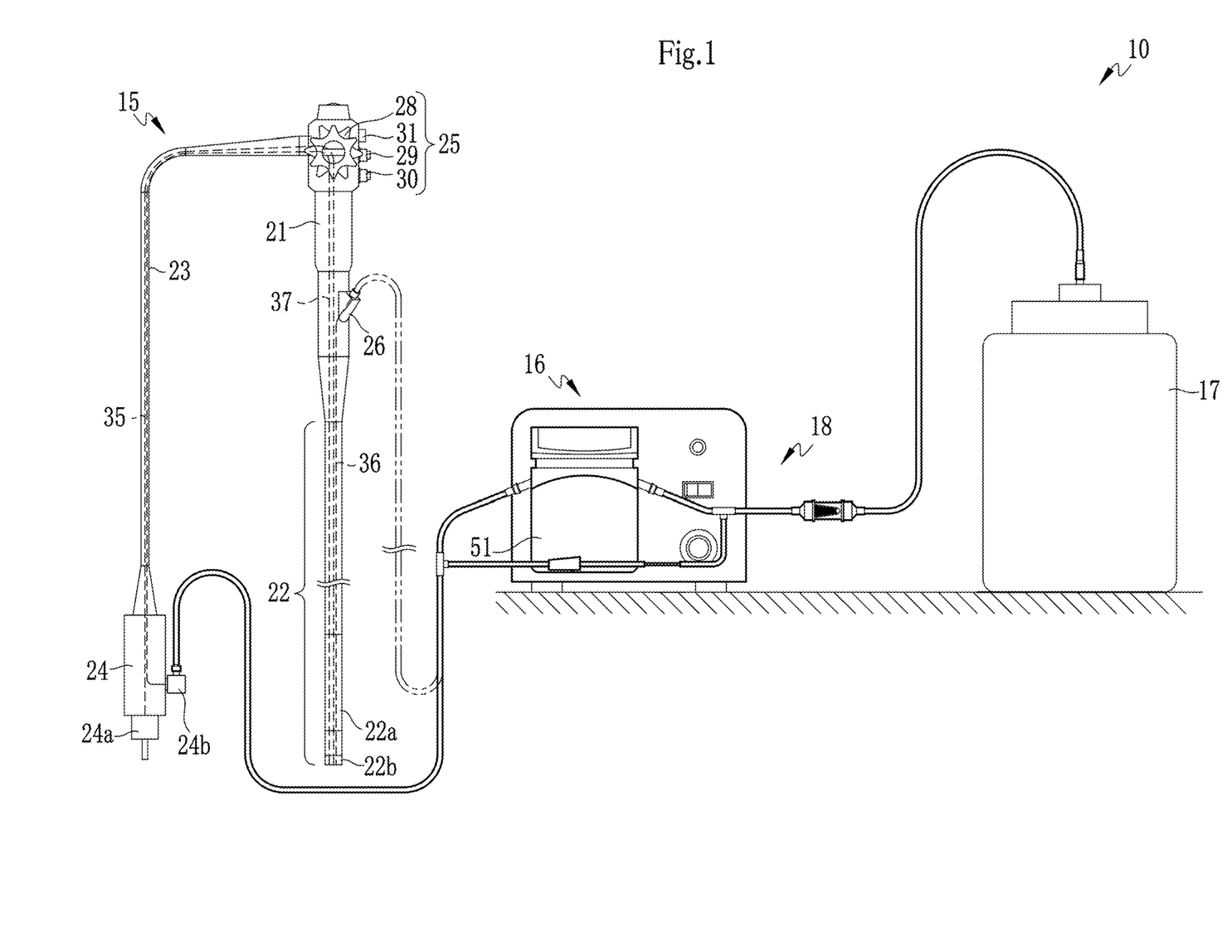
FIG. 1 shows one configuration of an endoscope system according to this embodiment.

Now, this embodiment is described with reference to the drawings. As illustrated in FIG. 1, an endoscope system 10 includes, for example, an endoscope 15, a water supply device 16, a water supply tank 17, and a pump tube unit 18. The endoscope 15 includes an operation handle 21, an endoscope insertion portion 22, a universal tube 23, and a connector 24.

The operation handle 21 includes, for example, a plurality of operating portions 25 and a forceps insertion portion 26. The plurality of operating portions 25 include, for example, an angle knob 28 and various other buttons, such as an air/water feed button 29, a suction button 30, and a shutter button 31. The angle knob 28 is rotated when a bending portion 22a provided on the distal end side of the endoscope insertion portion 22 is bent. The air/water supply button 29 is operated when cleaning an observation port 40 and illumination ports 41 and 42 provides at a distal end of a nozzle 22b of the endoscope insertion portion 22. The suction button 30 is operated when using the forceps port 44 provided at the distal end of the nozzle 22b of the endoscope insertion portion 22 to suction wastes in the body cavity (including liquid used to wash the target site in the body cavity). The shutter button 31 is operated when an imaging device (not shown) provided inside the distal end of the endoscope insertion portion 22 is used to image a target site within the body cavity.

A treatment instrument such as forceps is inserted into the forceps insertion portion 26. When the endoscope 15 is not in use, a forceps plug is attached to the forceps insertion portion 26. A lock adapter 79 of the pump tube unit 18, which will be described later, can be connected to the forceps plug via a connector (not shown).

The endoscope insertion portion 22 includes a light guide 35, a forceps channel 36 and a secondary water channel 37 in addition to an air channel and a water channel (not shown). The light guide 35 guides light, which is emitted from a light source device (not shown) connected to the connector 24, to the illumination ports 41 and 42 formed at the distal end of the nozzle 22b of the endoscope insertion portion 22.

The forceps channel 36 guides a treatment instrument such as forceps, which is inserted from the forceps insertion portion 26 provided to the operation handle 21, to the forceps port 44 provided at the distal end of the nozzle 22b of the endoscope insertion portion 22. Further, the forceps channel 36 supplies a liquid sent by the water supply device 16 to the forceps port 44, when the pump tube unit 18 is connected to the forceps insertion portion 26.

The secondary water feed channel 37 sends the liquid sent from the pump tube unit 18 connected to a tube connecting portion 24b to a secondary water supply port 45 provided at the distal end of the nozzle 22b of the endoscope insertion portion 22.

The universal tube 23 connects the operation handle 21 and the connector 24. The universal tube 23 includes the light guide 35, the secondary water feed channel 37, and the like inside.

The connector 24 includes a plurality of connector portions, such as a light source connecting portion 24a, which allows connection to the light source device, and the tube connecting portion 24b, which allows to the pump tube unit.

Figure 2:
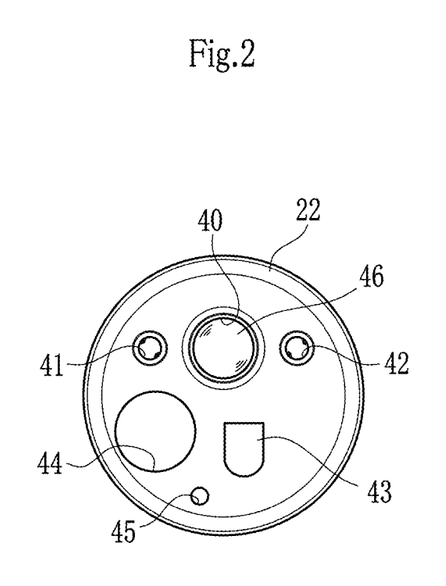
FIG. 2 shows one configuration of a distal end of a nozzle provided to an endoscope insertion portion.

As shown in FIG. 2, the nozzle 22b of the endoscope insertion portion 22 has the observation port 40, the illumination ports 41 and 42, an air/water supply nozzle 43, the forceps port 44, and the secondary water supply port 45. The configuration of the nozzle 22b is only an example, and the type and position of openings of the nozzle 22b can be set as needed.

The observation port 40 exposes the objective lens 46 of the imaging device inside the tip of the endoscope insertion portion 22. The objective lens 46 captures an observation image of the target site in the body cavity into the imaging device. The illumination ports 41 and 42 emit light guided by light guide 35 as illumination light toward the target site and the vicinity of the target site in the body cavity. The light guided by the light guide 35 is emitted to the target site and the vicinity of the target site in the body cavity.

The air/water supply nozzle 43 jets air or a liquid toward the observation port 40 and the illumination ports 41 and 42 to clean the observation port 40, the illumination ports 41 and 42 and the vicinity.

The forceps port 44 is used to insert and remove the distal end of the treatment instrument inserted from the forceps insertion portion 26. The forceps port 44 also functions as a suction port for suctioning blood and other contaminants that have bled in the body cavity when a suction device is connected to the endoscope 15. Here, an inner diameter of the forceps port 44 is 2 mm to 3.2 mm. The secondary water supply port 45 spurts out the liquid that sent to the secondary water supply channel 37 of the endoscope 15 via the water supply device 16. Here, the inner diameter of the secondary water supply port 45 is 1 mm.

The water supply device 16 is a device that supply the liquid stored in the water supply tank 17 toward the endoscope 15 when a pump of the device is driven. The water supply device 16 is driven by, for example, a pressing operation performed on a foot switch (not shown). In this embodiment, as shown in FIG. 3, the water supply device 16 including a roller pump 51 is described.

Figure 3:
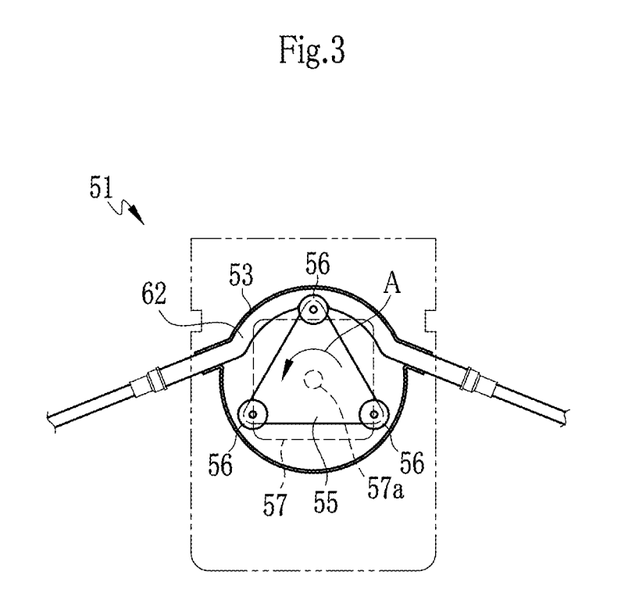
FIG. 3 shows one configuration of a roller pump with a water supply device.

As shown in FIG. 3, the roller pump 51 has a pump tube 62 installed along the inside of the arc-shaped guide wall 53 provided on the front surface.

The pump tube 62 installed in the roller pump 51 is maintained along an outer circumference of a rotary body 55, which will be described later.

The roller pump 51 includes the rotary body 55, rollers 56, and a motor 57. As an example, the rotary body 55 is a plate member having a substantially triangular shape. A shape of the rotary body 55 may be a plate member having a polygonal shape in accordance with the number of rollers that are pivotably supported, or may be a disc-shaped member. The rotary body 55 is firmly fixed to a drive shaft 57a of the motor 57 and rotates in a counterclockwise direction (direction A) in FIG. 3 when the motor 57 is driven.

The rollers 56 are pivotally supported on a side opposite to a fixed surface where the rotary body 55 is fixed to the motor 57 and at the same distance from the center of rotation of the rotary body 55. In FIG. 3, the rollers 56 are rotatably supported near the respective vertices of the rotating body 55 which is an equilateral triangular plate member. That is, the rollers 56 are arranged at intervals of 120 degrees. Here, a gap (clearance) between rotation trajectory of the plurality of rollers 56 and the arcuate guide wall 53 is, for example, 3.1 mm.

The rollers 56 rotates while pressing (squeezing) the pump tube 62 drawn along the inner side of the arcuate guide wall 53 when the rotary body 55 rotates. When the rollers 56 squeeze the pump tube 62, a liquid inside the pump tube 62 is pushed out toward the endoscope 15. Further, when the pump tube 62 draws in the liquid stored in the water supply tank 17 when returning to its original state after being squeezed by the rollers 56. As described above, the rollers 56 are arranged at intervals of 120 degrees. Therefore, when the rotary body 55 rotates once, the above-mentioned operation is performed by all the three rollers 56. Although the roller 56 is described as an example of a pressing portion, a pressing piece that protrudes to an outside of the rotary body 55 may be used in place of the roller.

Here, a water amount supplied by the water supply device 16 is set to a water amount supplied when using a pump tube having an inner diameter of 6.6 mm and an outer diameter of 9.7 mm, for example. In this case, the water amount sent when using a pump tube with an inner diameter of 6.6 mm and an outer diameter of 9.7 mm is set to, for example, 700 ml/min.

Returning to FIG. 1, in the endoscope system 10, the liquid stored in the water supply tank 17 is sent to the endoscope 15 via the pump tube unit 18 installed in the water supply device 16 while the water supply device 16 is driven.

Figure 4:
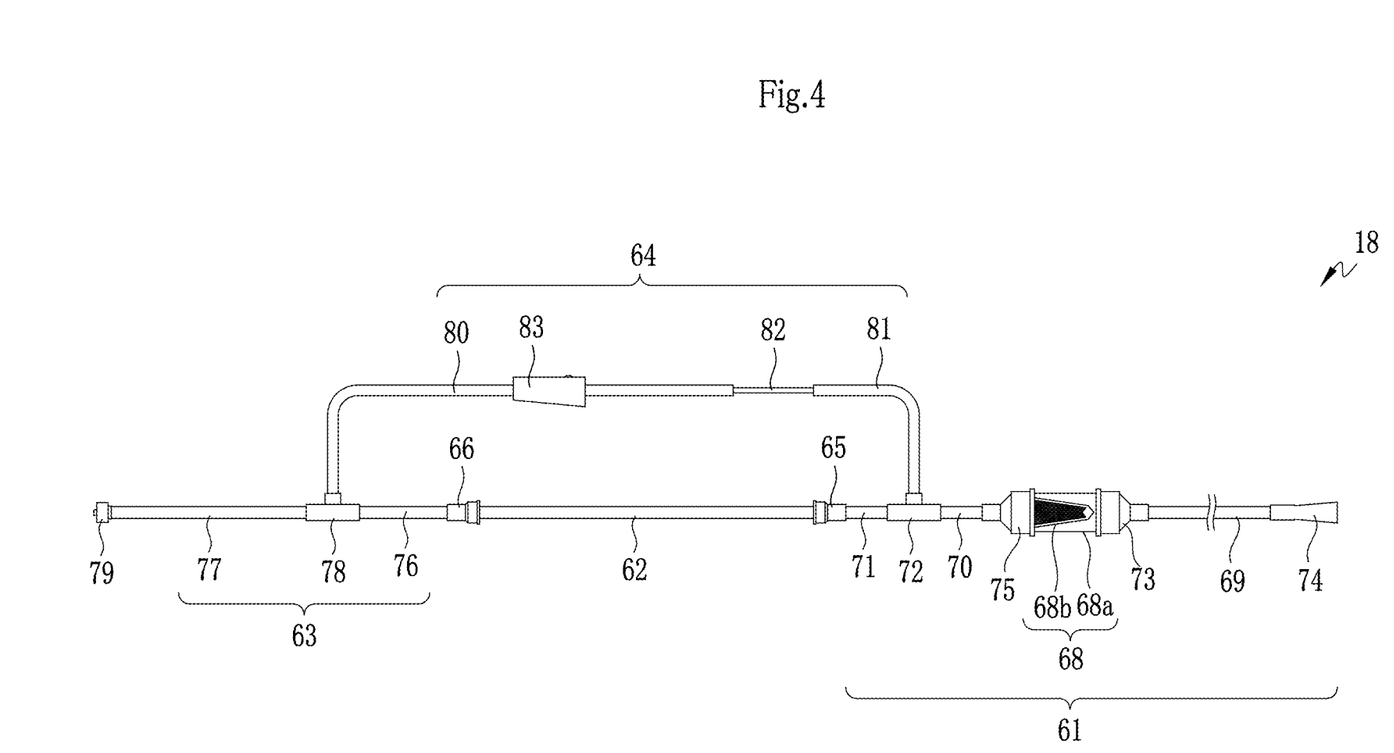
FIG. 4 shows one configuration of a pump tube unit.

As shown in FIG. 4, the pump tube unit 18 includes a water supply tube 61 with a filter, the pump tube 62, a water supply tube 63 with a joint, and a bypass water supply tube 64.

The pump tube unit 18 is formed integrally in the following manner. the water supply tube 61 with a filter and the pump tube 62 connected by a joint 65, and the pump tube 62 and the water supply tube 63 connected by a joint 66, and the bypass water supply tube 64 across the water supply tube 61 with a filter and the water supply tube 63 with a joint to make a single unit.

The water supply tube 61 with a filter includes a filter device 68, water supply tubes 69, 70, and 71, and a T-shaped joint 72. The filter device 68 includes a case 68a and a filter body 68b housed in the case 68a. The case 68a is a cylindrical member with both open ends. A material of the case 68a is, for example, a transparent or translucent synthetic resin material or glass. The case 68a has an inner diameter of 17.0 mm and an outer diameter of 20.0 mm. The filter body 68b is an abbreviated conical-shaped member with an open bottom and a filter net formed on the conical surface. The filter body 68b is fixed inside the case 68a in such a manner that a bottom surface of the filter main body 68b is located on a downstream side.

The water supply tubes 69, 70, and 71 are made of a polyvinyl chloride resin (PVC), for example. The water supply tubes 69, 70, and 71 have an inner diameter of 4 mm and an outer diameter of 6.0 mm. Among the water supply tubes 69, 70, and 71, the water supply tube 69 is connected to the filter device 68 with use of a joint 73 on an upstream side of the filter device 68. Further, the water supply tube 69 has a connector 74 at an end opposite to the one end connected to the filter device 68. The connector 74 is connected to a suction tube of the water supply tank 17.

Further, the water supply tube 70 is connected to the filter device 68 with use of a joint 75 on a downstream side of the filter device 68. At the same time, the water supply tube 70 connects a water supply tube 71 via the T-shaped joint 72, to an end opposite to one end connected to the filter device 68. Further, the water supply tube 71 is connected to the joint 65 at the end opposite to the end connected to the T-shaped joint 72.

The T-shape joint 72 is, for example, a member that divides a flow of a liquid flowing in one direction or joins flows of liquids that flows in two directions. The T-shaped joint 72 connects the bypass water supply tube 64 in addition to the water supply tubes 70 and 71. The T-shaped joint 72 joins a liquid flowing from the water supply tube 70 and a liquid flowing from the bypass water supply tube 64.

The pump tube 62 is a member that is guided along an inner peripheral surface of the arcuate guide wall 53 provided in the roller pump 51. The pump tube 62 is made of, for example, a polyvinyl chloride resin (PVC). The pump tube 62 has an inner diameter of 6.6 mm and an outer diameter of 9.7 mm.

The water supply tube 63 with a joint includes water supply tubes 76 and 77 and a T-shaped joint 78. The water supply tubes 76 and 77 are tubes made of, for example, a polyvinyl chloride resin (PVC). The water supply tubes 76 and 77 have an inner diameter of 4 mm and an outer diameter of 6.0 mm. The water supply tube 76 has one end connected to the Joint 66 and other end connected to the T-shaped joint 78. The water supply tube 77 is connected to the T-shaped joint 78 at one end. The water supply tube 77 fixes a lock adapter (luer connector) 79 at the other end opposite to the one end connected to the T-shaped joint 78. The lock adapter 79 is connected to the forceps insertion portion 26 provided on the operation handle 21 of the endoscope 15 or the tube connecting portion 24b of the connector 24 of the endoscope 15.

Like the T-shaped joint 72, the T-shape joint 78 is, for example, a member that branches a flow of a liquid flowing in one direction or joins flows of liquids flowing in two directions. The T-shaped joint 78 connects the bypass water supply tube 64 in addition to the water supply tubes 76 and 77. The T-shaped joint 78 divides a liquid flowing from the water supply tube 76 into a flow of a liquid flowing through the water supply tube 77 and a flow of a liquid flowing through the bypass water supply tube 64.

The bypass water supply tube 64 includes water supply tubes 80 and 81 and a control tube 82. The water supply tubes 80 and 81 are tubes made of, for example, a polyvinyl chloride resin (PVC). The water supply tubes 80 and 81 have an inner diameter of 3.1 mm and an outer diameter of 5.1 mm. The water supply tube 80 is connected to the T-shaped joint 78 under a state in which the control tube 82 is firmly fixed between the water supply tube 80 and the water supply tube 81. Further, the water supply tube 81 is connected to the T-shaped joint 72.

The water supply tube 80 includes a roller clamp 83. The roller clamp 83 presses the water supply tube 80 with a roller to change a cross-sectional area inside the water supply tube 80 at a pressing position, thereby adjusting a flow rate of the liquid flowing through the water supply tube 80. Specifically, the roller clamp 83 moves between a position where a roller press down on the water supply tube 80 to close the pressurized portion (hereinafter referred to as "closing position") and a position where the roller release pressure on the water supply tube 80 (hereinafter referred to as "opening position").

The control tube 82 is a tube made of, for example, a polyvinyl chloride resin (PVC). The control tube 82 has an inner diameter of 0.8 mm and an outer diameter of 3.2 mm. The control tube 82 is firmly fixed to the water supply tubes 80 and 81 with use of, for example, a solvent such as cyclohexanone. In this case, the material of the control tube 82 may be ABS resin, polypropylene (PP), or the like instead of polyvinyl chloride resin.

Next, a case of supplying water to the endoscope 15 using the pump tube unit 18 described above will be described. First, the case where the pump tube unit 18 is connected to the forceps insertion portion 26 of the endoscope 15 will be described. In this case, the roller of the roller clamp 83 of the bypass water supply tube 64 is maintained at the closing position. When the water supply device 16 is driven, the roller pump 51 is actuated to rotate the rotary body 55. As the rotary body 55 rotates, the pump tube 62 is squeezed by one of plurality of rollers 56 pivotally supported on the rotary body 55. By squeezing the pump tube 62 with one of the plurality of rollers 56, a liquid inside the pump tube 62 is pushed out, and at the same time the liquid stored in the water supply tank 17 is drawn (sucked) into the pump tube 62.

As described above, the roller of the roller clamp 83 of the bypass water supply tube 64 is maintained at the closing position, so the bypass water supply tube 64 is in a closed state in which the liquid does not flow. Accordingly, the liquid pushed out from the pump tube 62 reaches the T-shaped joint 78 via the water supply tube 76, and then is sent to the water supply tube 77 without being diverted to the bypass water supply tube 64. That is, all of the liquid pushed out from the pump tube is sent toward the endoscope 15 and discharged from the forceps port 44 via the forceps channel 36. Since the bypass water supply tube 64 is in a closed state, the liquid drawn by the pump tube 62 does not flow from the T-shaped joint 72 into the bypass water supply tube 64 and flows directly toward the pump tube 62.

Next, a case where the pump tube unit 18 is connected to the tube connecting portion 24b of the connector 24 of the endoscope 15 will be described. In this case, the roller of the roller clamp 83 of the bypass water supply tube 64 is maintained at the opening position. When the water supply device 16 is driven to actuate the roller pump 51, the liquid is sent through the pump tube 62 and the liquid is drawn from the water supply tank 17.

The liquid sent from the pump tube 62 flows through the water supply tube 76 and then the water supply tube 77 or the water supply tube 80. The bypass water supply tube 64 includes the control tube 82 having an inner diameter smaller than that of the water supply tube 80 and 81 arranged between the water supply tubes 80 and 81. With the arrangement of the control tube 82, the internal pressure of the water supply tube 80 is maintained higher than the internal pressure of the water supply tube 81 by the liquid sent from the pump tube 62 when the water supply device 16 is in operation therefore, in the bypass water supply tube 64, the liquid flows from the water supply tube 80 toward the water supply tube 81, but does not flow from the water supply tube 81 toward the water supply tube 80. The liquid flowing from the water supply tube 80 to the water supply tube 81 merge with the liquid flowing through the water supply tube 70 at the T-shaped joint 72.

As described above, part of the liquid sent from the pump tube 62 flows through the bypass water supply tube 64, which has a disadvantage of reducing the amount of the liquid sent to the endoscope 15. However, a remarkable effect can be obtained in that an increase in the internal pressure of the pump tube 62 can be obtained. By suppressing the increase in internal pressure of the pump tube 62, the occurrence of water dripping from the secondary water supply port 45 of the endoscope 15 is suppressed when the water supply device 16 is stopped. At the same time, since the increase in the internal pressure of the pump tube unit 18 is suppressed, the occurrence of a crack in the pump tube 62 and the occurrence of water leakage due to breakage of the pump tube 62 are prevented.

Verification tests, which were conducted before the pump tube unit 18 according to this embodiment was put into practical use, are now described.

First, a discharge amount of the liquid from the forceps port when the pump tube unit 18 is connected to the forceps insertion portion 26 of the endoscope 15 was measured for two cases. The two cases correspond to a case in which the bypass water supply tube 64 is placed in the open state and a case in which the bypass water supply tube 64 is placed in the closed state. The amount of liquid water supplied and the amount of liquid ejected were measured at intervals of 30 seconds. Also, the water supply device 16 was stopped when 30 seconds, 60 seconds, 90 seconds, 120 seconds and 150 seconds had elapsed since the start of water supplied, and the presence or absence of water dripping from the auxiliary water supply port 45 was checked. Further, whether or not the pump tube 62 had a crack or was broken was also checked. In this case, an average discharge amount from the forceps port was calculated from a change amount obtained after 30 seconds from the start of water supplying.

Figure 5A:
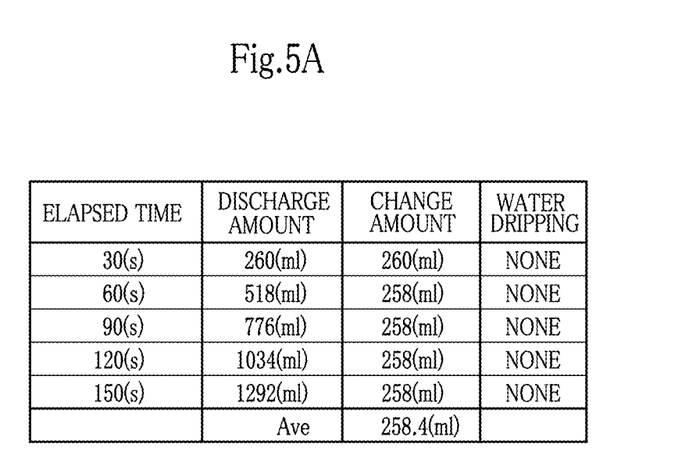
FIG. 5A shows the verification results of the discharge volume discharged from the forceps port when the bypass water supply tube is opened, when the pump tube unit is connected to the forceps insert portion of the endoscope.

As shown in FIG. 5A, when the bypass water supply tube 64 was placed in the open state, an average of discharge amounts from the forceps port 44 was 258.4 ml. When the bypass water supply tube 64 was placed in the open state, even if the water supply device was stopped when any of 30 seconds, 60 seconds, 90 seconds, 120 seconds, and 150 seconds from the start of water sending, water dripping from the forceps port 44 did not occur. Further, the pump tube 62 did not have a crack or other damage.

Figure 5B:
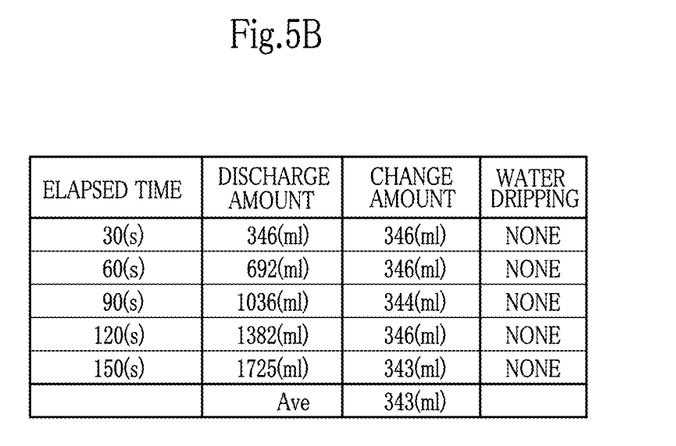
FIG. 5B shows the verification results of the discharge volume discharged from the forceps port when the bypass water supply tube is closed, when the pump tube unit is connected to the forceps insert portion of the endoscope.

Further, as shown in FIG. 5B, when the bypass water supply tube 64 was placed in the closed state, an average of discharge amounts from the forceps port 44 was 343 ml. When the bypass water supply tube 64 was placed in the closed state and the water supply device was stopped when any one of 30 seconds, 60 seconds, 90 seconds, 120 seconds, and 150 seconds from the start of water sending, water dripping from the forceps port 44 did not occur.

As a result of the above verification test, when the pump tube unit 18 is connected to the forceps insertion portion 26 of the endoscope 15 and used, it is effective to place the bypass water supply tube 64 in the open state in terms of reducing the occurrence of a crack in the pump tube 62.

When the bypass water supply tube 64 is placed in the closed state, the discharge amount from the forceps port 44 is 686 l/min, and a discharge amount from the forceps port 44 when the bypass water supply tube 64 is in the open state is 516.8 l/min. In other words, when the bypass water supply tube 64 is placed in the open state, 25% of the liquid is caused to flow back through the bypass water supply tube 64. Considering that the water amount set in the water supply device 16 is 700 ml/min, water sending performance of the water supply device 16 can be fully utilized when the bypass water supply tube 64 is placed in the open state. Thus, it is found that, in view of effective use of the water sending performance of the water supply device 16, it is effective to place the bypass water supply tube 64 in the closed state.

Next, a discharge amount of the liquid from the auxiliary water supply port 45 when the pump tube unit 18 is connected to the tube connecting portion 24b of the connector 24 of the endoscope 15 was measured for two cases. The two cases correspond to a case in which the bypass water supply tube 64 is placed in the open state and a case in which the bypass water supply tube 64 is placed in the closed state. The amount of liquid water supplied and the amount of liquid ejected were measured at intervals of 30 seconds. Also, the water supply device 16 was stopped when 30 seconds, 60 seconds, 90 seconds, 120 seconds, and 150 seconds had elapsed since the start of water supplied, and the presence or absence of water dripping from the auxiliary water supply port 45 was checked. Further, whether or not the pump tube 62 had a crack or was broken was also checked. In this case, an average discharge amount from the secondary water supply port 45 was calculated from a change amount obtained after 30 seconds from the start of water sending.

Figure 6A:
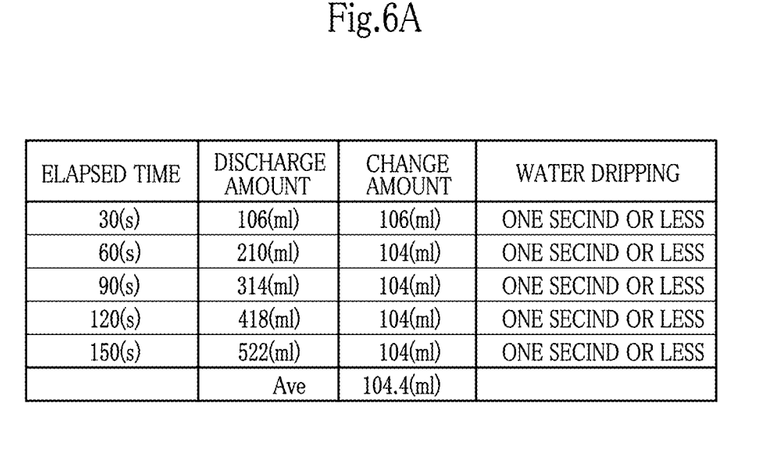
FIG. 6A shows the verification results of the discharge volume discharged from the secondary water supply port when the bypass water supply tube is opened, when the pump tube unit is connected to the tube connection of the connector of the endoscope.

As shown in FIG. 6A, when the bypass water supply tube 64 was placed in the open state, an average of discharge amounts from the secondary water supply port 45 was 104.4 ml. When the bypass water supply tube 64 was placed in the open state and the water supply device was stopped when any of the elapsed time of 30 seconds, 60 seconds, 90 seconds, 120 seconds, and 150 seconds has passed, water from the secondary water supply port 45 occurred, but the water dripping was resolved in one second or less. Further, the pump tube 62 did not have a crack or other damage.

Figure 6B:
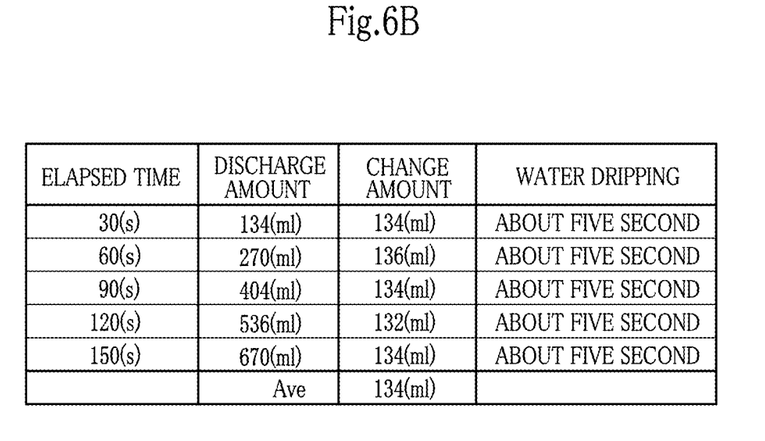
FIG. 6B shows the verification results of the discharge volume discharged from the secondary water supply port when the bypass water supply tube is closed, when the pump tube unit is connected to the tube connection of the connector of the endoscope.

Further, as shown in FIG. 6B, when the bypass water supply tube 64 was placed in the closed state, an average of discharge amounts from the secondary water supply port 45 was 134 ml. However, when the bypass water supply tube 64 was placed in the closed state and two liters of the liquid was sent, the pump tube 62 was broken and water leakage occurred. When the bypass water supply tube 64 was placed in the closed state and the water supply device was stopped when any one of 30 seconds, 60 seconds, 90 seconds, 120 seconds, and 150 seconds had passed since the water supply started, water dripped from the secondary water supply port 45. The water dripping continued for about 5 seconds.

As a result of the verification test described above, when the pump tube unit 18 is used by being connected to the tube connecting portion 24b of the connector 24 of the endoscope 15, water drips from the secondary water supply port 45. However, dripping time can be suppressed to a short time. Thus, it is found that it is effective to use the bypass water supply tube in the open state. Further, in view of the prevention of breaking of the pump tube, it is found that it is effective to place the bypass water supply tube in the open state.

The invention claimed is:

1. A pump tube unit, comprising:
 a pump tube installed in a pump including a rotary body and a plurality of pressing portions arranged on an outer peripheral edge portion of the rotary body at predetermined angular intervals, the pump tube being configured to repeat an operation of sending a liquid held inside to a downstream side and drawing in a liquid from an upstream side when being pressed by any one of the plurality of pressing portions in turn during rotation of the rotary body;
 an upstream-side water supply tube connected to an upstream-side end portion of the pump tube to allow the liquid drawn into the pump tube to flow therethrough;
 a downstream-side water supply tube connected to a downstream-side end portion of the pump tube to allow the liquid sent from the pump tube to flow therethrough; and
 a bypass water supply tube connected across the upstream-side water supply tube and the downstream-side water supply tube, the bypass water supply tube being configured to cause a part of the liquid flowing through the downstream-side water supply tube to flow back into the upstream-side water supply tube, wherein the bypass water supply tube includes a small-diameter portion extending over a predetermined range except for both end portions of the bypass water supply tube in a longitudinal direction of the bypass water supply tube, the small-diameter portion having an inner diameter smaller than an inner diameter of a range of the bypass water supply tube except for the predetermined range, wherein the bypass water supply tube includes:
- a first water supply tube to be connected to the downstream-side water supply tube;
- a second water supply tube having the same diameter as a diameter of the first water supply tube, the second water supply tube to be connected to the upstream-side water supply tube; and
- a third water supply tube arranged between the first water supply tube and the second water supply tube, the third water supply tube having an inner diameter smaller than an inner diameter of the first water supply tube and an inner diameter of the second water supply tube, wherein a clamp is arranged in the first water supply tube, and being configured to switch between a state in which the first water supply tube is closed and a state in which the first water supply tube is open, and wherein the clamp maintains the first water supply tube in an open state when the downstream-side water supply tube is connected to a secondary water supply channel of an endoscope and maintains the first water supply tube in a closed state when the downstream-side water supply tube is connected to a forceps channel of the endoscope.

2. An endoscope system, comprising:
an endoscope including a forceps channel configured to allow at least a treatment instrument to be inserted therethrough; and a water supply channel configured to allow a liquid to flow therethrough;
a water supply tank configured to store the liquid;
a pump including a rotary body and a plurality of pressing portions arranged on an outer peripheral edge portion of the rotary body at predetermined angular intervals; and
a pump tube unit having one end portion to be connected to the water supply tank and other end portion to be connected to at least one of the forceps channel or the water supply channel of the endoscope, wherein the pump tube unit comprises:
a pump tube installed in the pump, the pump tube being configured to repeat an operation of sending a liquid held inside to a downstream side and drawing in a liquid from an upstream side when being pressed by any one of the plurality of pressing portions in turn during rotation of the rotary body;
an upstream-side water supply tube connected to an upstream-side end portion of the pump tube to allow the liquid drawn into the pump tube to flow therethrough;
a downstream-side water supply tube connected to a downstream-side end portion of the pump tube to allow the liquid sent from the pump tube to flow therethrough; and
a bypass water supply tube connected across the upstream-side water supply tube and the downstream-side water supply tube, the bypass water supply tube being configured to cause a part of the liquid flowing through the downstream-side water supply tube to flow back into the upstream-side water supply tube, wherein the bypass water supply tube includes a small-diameter portion extending over a predetermined range except for both end portions of the bypass water supply tube in a longitudinal direction of the bypass water supply tube, the small-diameter portion having an inner diameter smaller than an inner diameter of a range of the bypass water supply tube except for the predetermined range, wherein, when the downstream-side end portion of the pump tube unit is connected to the water supply channel of the endoscope, the pump is driven under a state in which the bypass water supply tube is maintained in an open state so as to supply the liquid to the water supply channel of the endoscope while causing a part of the liquid sent by the pump tube to flow back inside the pump tube unit, and wherein, when the downstream-side end portion of the pump tube unit is connected to the forceps channel of the endoscope, the pump is driven under a state in which the bypass water supply tube is maintained in a closed state so as to send the liquid sent by the pump tube to the forceps channel of the endoscope without causing the liquid to flow back inside the pump tube unit.

* * * * *